(12) United States Patent
Uchida

(10) Patent No.: US 8,259,322 B2
(45) Date of Patent: Sep. 4, 2012

(54) PRINTING SYSTEM, PRINTING PROGRAM, INFORMATION COLLECTION METHOD, INFORMATION SEARCH METHOD AND INFORMATION SEARCH SYSTEM

(75) Inventor: Tatsuro Uchida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1091 days.

(21) Appl. No.: 11/557,171

(22) Filed: Nov. 7, 2006

(65) Prior Publication Data

US 2007/0121151 A1    May 31, 2007

(30) Foreign Application Priority Data

Nov. 28, 2005 (JP) ................................. 2005-342845

(51) Int. Cl.
*G06F 3/12* (2006.01)
*H04N 1/00* (2006.01)

(52) U.S. Cl. ........................................ 358/1.15; 358/403

(58) Field of Classification Search .................. None
See application file for complete search history.

(56) References Cited

U.S. PATENT DOCUMENTS

| 6,199,073 | B1 |   | 3/2001 | Peairs et al. ................. 707/204 |
| 7,383,474 | B2 | * | 6/2008 | Sekizawa ........................ 714/57 |
| 2006/0110200 | A1 | * | 5/2006 | Kujirai et al. .................... 400/76 |
| 2006/0119887 | A1 |   | 6/2006 | Aritomi et al. |
| 2007/0008577 | A1 | * | 1/2007 | Matsuura et al. ............. 358/1.15 |

FOREIGN PATENT DOCUMENTS

| CN | 1779691 A | 5/2006 |
| JP | 2002-149371 | 5/2002 |
| JP | 2003-032484 A | 1/2003 |
| JP | 2003-288327 | 10/2003 |
| JP | 2003-330677 | 11/2003 |
| JP | 2004-118243 | 4/2004 |
| JP | 2004-228772 A | 8/2004 |
| JP | 2004-252784 | 9/2004 |

OTHER PUBLICATIONS

The above references were cited in a Feb. 1, 2008 Chinese Office Action issued in the counterpart Chinese Patent Application 200610146893.6, without translation.
The above references were cited in a May 21, 2010 Japanese Office Action, without English Translation, that issued in Japanese Patent Application No. 2005-342845.

* cited by examiner

*Primary Examiner* — Thomas Lett
*Assistant Examiner* — Marcus T Riley
(74) *Attorney, Agent, or Firm* — Cowan, Liebowitz & Latman, P.C.

(57) ABSTRACT

In a client PC, after receiving drawing data, the log information generation unit (400) of a printer driver (203) refers to the current time, and collects a keyword, print job attribute item, and the like which satisfy an extraction condition corresponding to a time period including the current time. The log information generation unit groups the collected pieces of information into a log information file (320), and saves it in a log information storage server (1000). A search unit can read saved log information from the log information file in accordance with a desired search condition. The system administrator or the like inspects the read log information, and if information may leak, investigates it.

10 Claims, 15 Drawing Sheets

F I G. 9
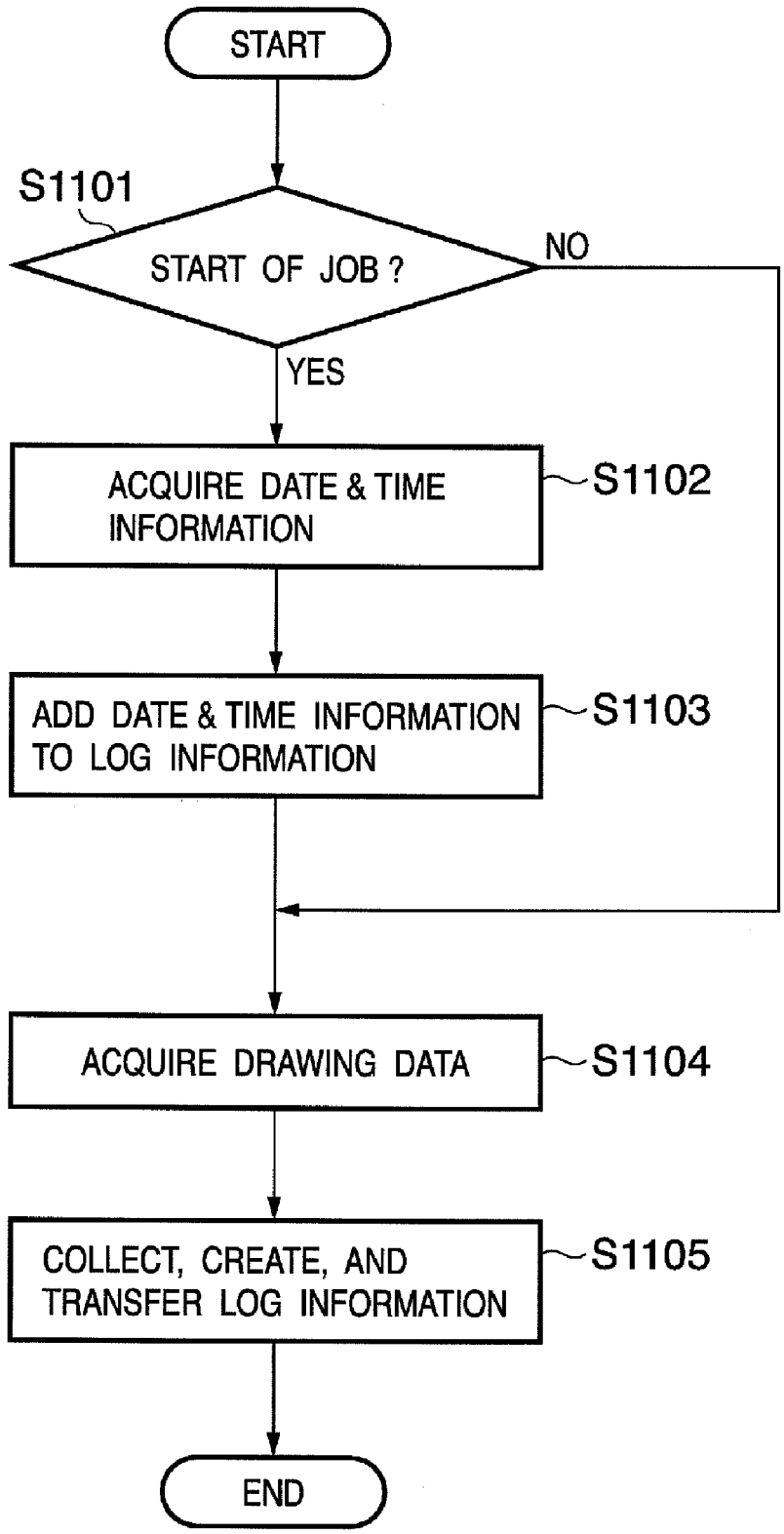

PRINTING SYSTEM, PRINTING PROGRAM, INFORMATION COLLECTION METHOD, INFORMATION SEARCH METHOD AND INFORMATION SEARCH SYSTEM

BACKGROUND OF THE INVENTION

1. Field of the Invention

The present invention relates to a printing system and the like capable of preventing, information leakage and, more particularly, to a printing system and the like which prevent information leakage by accumulating contents printed by an image forming apparatus as a log so as to enable tracking the print log.

2. Description of the Related Art

As a conventional measure against leakage of information saved in computers, there is widely used a method of setting an access right to confidential information or a storage server which stores it, and limiting users who can access the confidential information. However, most of the recent information leakage cases are intentional inside jobs by persons permitted to access confidential information.

Information to be protected from leakage includes not only an enormous amount of information typified by customer information of an enterprise, but also information which is small in amount but important in content. Such a small amount of information can be easily brought out as a printed material. For example, a person with an access right to given information may bring it out by printing.

To prevent this, demands have arisen for a measure against leakage of data saved in computers in the form of a printed material. For this purpose, many measures have been proposed as follows.

(1) Print permission information is set for a document to be printed or print data, and referred to in printing (see, e.g., patent reference 1).

(2) A user is authenticated to use a device connected to a network (see, e.g., patent reference 2).

(3) A print server saves print data in a reprintable state, and also saves information such as a job name, client name, and user name together with a time stamp. Further, bitmap data is generated from print data, and saved as a print log (see, e.g., patent reference 3).

(4) The printer side acquires a print log and stores it in a server (see, e.g., patent reference 4).

(5) Simultaneously when receiving print data from a client, a print server also receives information capable of uniquely specifying a user, generates a print log on the basis of the print data and user information, and enables searching, browsing, and reprinting the print data (see, e.g., patent reference 5).

[Patent Reference 1] Japanese Patent Application Laid-Open No. 2004-252784

[Patent Reference 2] Japanese Patent Application Laid-Open No. 2003-288327

[Patent Reference 3] Japanese Patent Application Laid-Open No. 2002-149371

[Patent Reference 4] Japanese Patent Application Laid-Open No. 2003-330677

[Patent Reference 5] Japanese Patent Application Laid-Open No. 2004-118243

However, the conventional method (patent reference 1) of embedding print permission information and the conventional method (patent reference 2) of authenticating a user require a special application and a network device such as a special printer. These methods are applied to limited applications. For example, information leakage can be prevented by introducing a special printing application and a network device such as a special printer into an office where users treat highly confidential information such as personal information in daily work. However, these methods can prevent information leakage in the use of a special application and special printer. That is, these methods narrow an environment where the information leakage prevention measure is applicable.

To the contrary, the methods of patent references 3 to 5 are free from these limitations. These methods do not pose any trouble in the operation in a general office. By limiting these methods to printing via a print server, print content information can be collected, accumulated, and tracked.

However, according to the methods of patent references 3 to 5, prevention of information leakage targets only printing via the print server. In other words, these methods are incompatible with transmission of print data from a client PC directly to a printing device such as a printer. For example, these methods do not cope with local port connection between a client and a printer, and connection by a network protocol. The print server must collect and generate print content information in addition to a normal printing process. When a plurality of client PCs nearly simultaneously request the same printer to print, the printing performance is expected to decrease. These methods require installation of the print server, and the installation space must be physically ensured.

In addition to these problems, the information leakage preventing system must consider leakage prevention effects corresponding to the property of treated information and the date and time of an output operation. For example, considering daily printing in an office, an action to print a large amount of confidential information stands out during the daytime on business days, and a user would refrain from it. That is, the time period of the daytime on business days prevents information leakage to some extent. In contrast, during the weekend or time period from the night to morning on business days, few people witness an action to print a large amount of confidential information. The information leakage prevention force depending on the time period weakens.

The following problems arise if information contents to be collected to prevent information leakage and the inspection level of collected information are kept unchanged during all the time periods regardless of the above-mentioned facts. More specifically, information contents to be collected and the inspection level must be adjusted in accordance with a time period during which the information leakage prevention force is weak (i.e., leakage is highly likely to occur); otherwise, generated information leakage may be missed. Even during a time period during which the information leakage prevention force is high, superfluous information is collected and inspected. These processes decrease the value of collected log information and the verification efficiency of the inspection result. This results in the necessity for a large-capacity storage medium, a long inspection time, and high management cost.

Companies, government offices, organizations, and the like, which treat information to be open to the public (e.g., information on the settlement of accounts of companies, information on new products and services, patent information, and information on takeover bids), must strictly manage these pieces of information before opening to the public. After opening to the public, the confidentiality of these pieces of information is lost, and they need not be managed as confidential information. For open information, it is enough to collect normal-level log information and inspect the log. Hence, it raises the management cost, similar to the above-described case, to collect log information of open information at the same level as that for confidential one and inspect the collected log information regardless of whether information is open to the public.

SUMMARY OF THE INVENTION

The present invention has been made in consideration of the conventional situation, and has as its object to provide a printing system and the like capable of efficiently collecting and inspecting log information by collecting contents corresponding to one or both of the date and time, as log information for preventing information leakage.

It is another object of the present invention to provide a printing system and the like capable of efficiently controlling the management level of each print job by embedding, in print data, security information representing one or both of the protection level and the protection period at the level.

In order to solve the above problems, the present invention comprises the following configuration.

That is, a printing system comprises
  determination means for determining an extraction condition corresponding to current time information among extraction conditions saved in correspondence with pieces of time information,
  extraction means for extracting, from print data, information which satisfies the extraction condition determined by the determination means, and
  save means for saving the information extracted by the extraction means as log information in a storage unit.

An information search system capable of searching a database of pieces of log information saved in correspondence with collection times for information which satisfies a given condition comprises
  determination means for determining a search condition corresponding to a given time among search conditions saved in correspondence with pieces of time information, and
  search means for searching the database for the search condition determined by the determination means to acquire satisfying information.

An information collection method of collecting log information, comprises the steps of
  determining an extraction condition corresponding to current time information among extraction conditions saved in correspondence with pieces of time information
  extracting, from print data, information which satisfies the extraction condition determined in the determining step and
  saving the information extracted in the extracting step as log information in a storage unit.

An information search method of searching a database of pieces of log information saved in correspondence with collection times for information which satisfies a given condition comprises the steps of
  determining a search condition corresponding to a given time among search conditions saved in correspondence with pieces of time information and
  searching the database for the search condition determined in the determining step to acquire satisfying information.

A program which is recorded on a computer-readable recording medium and causes a computer to execute a method of collecting log information from input print data, the method comprises the steps of
  determining an extraction condition corresponding to current time information among extraction conditions saved in correspondence with pieces of time information
  extracting, from print data, information which satisfies the extraction condition determined in the determining step and
  saving the information extracted in the extracting step as log information in a storage unit.

A program which is recorded on a computer-readable recording medium and causes a computer to execute a method of searching a database of pieces of log information saved in correspondence with collection times for information which satisfies a given condition, the method comprises the steps of
  determining a search condition corresponding to a given time among search conditions saved in correspondence with pieces of time information and
  searching the database for the search condition determined in the determining step to acquire satisfying information.

The present invention can collect log information on an extraction condition corresponding to the issuing date and time of a print job, or search for log information collected on a search condition corresponding to the date and time. The present invention can efficiently collect and inspect information. As a result, the present invention can increase the density and precision of collected information, and effectively inspect information with the time-limit value.

The present invention can provide an information leakage preventing system which balances cost and performance by selectively enhancing the security level.

Further features of the present invention will become apparent from the following description of exemplary embodiments (with reference to the attached drawings).

BRIEF DESCRIPTION OF THE DRAWINGS

FIG. 9 is a flowchart showing the process of a log information generation unit in FIG. 8;

DESCRIPTION OF THE EMBODIMENTS

First Embodiment

The first embodiment of the present invention will be described in detail below with reference to the accompanying drawings.

<Configuration of Printing System>

Figure 1:
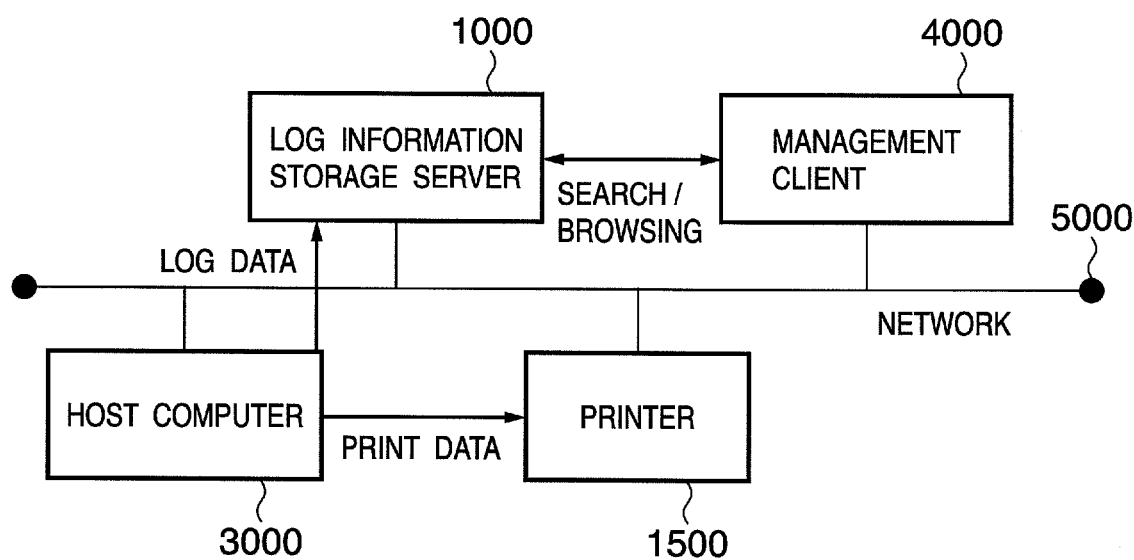
FIG. 1 is a block diagram showing the configuration of a printing system according to an embodiment of the present invention.

FIG. 1 is a block diagram showing an example of the configuration of a printing system according to the first embodiment of the present invention. The printing system includes an information processing apparatus such as a host computer 3000, and an image forming apparatus such as a printer 1500 locally connected to the host computer 3000. The host computer 3000 and printer 1500 connect to a network 5000. The printing system also includes a log information storage server 1000 and management client 4000 which connect to the network 5000.

The host computer 3000 accepts a print request from a user, generates print data corresponding to the contents of the print request, and transmits the print data to the printer 1500. The host computer 3000 extracts and generates log information complying with the print request, and transmits it to the log information storage server 1000.

The printer 1500 executes a printing process (print job) in accordance with the received print data. The log information storage server 1000 registers the log information received from the host computer 3000, as a database in a storage area ensured in the server 1000 itself or another information device. The system administrator uses the management client 4000 to search and browse log information registered in the database, as needed. For this purpose, a database search/browsing program managed by the log information storage server 1000 is installed in the management client 4000. The management client 4000 may be the same information device as the log information storage server 1000.

In the first embodiment, log information is sometimes called user tracking information because it is referred to in order to track a user who printed. Log information is also called user tracking data. Log information contains some contents of print data, and information capable of specifying a print job such as the attributes of a print job (e.g., the job ID and issuing date & time of a print job).

<Arrangements of Host Computer 3000 and Printer 1500>

Figure 2:
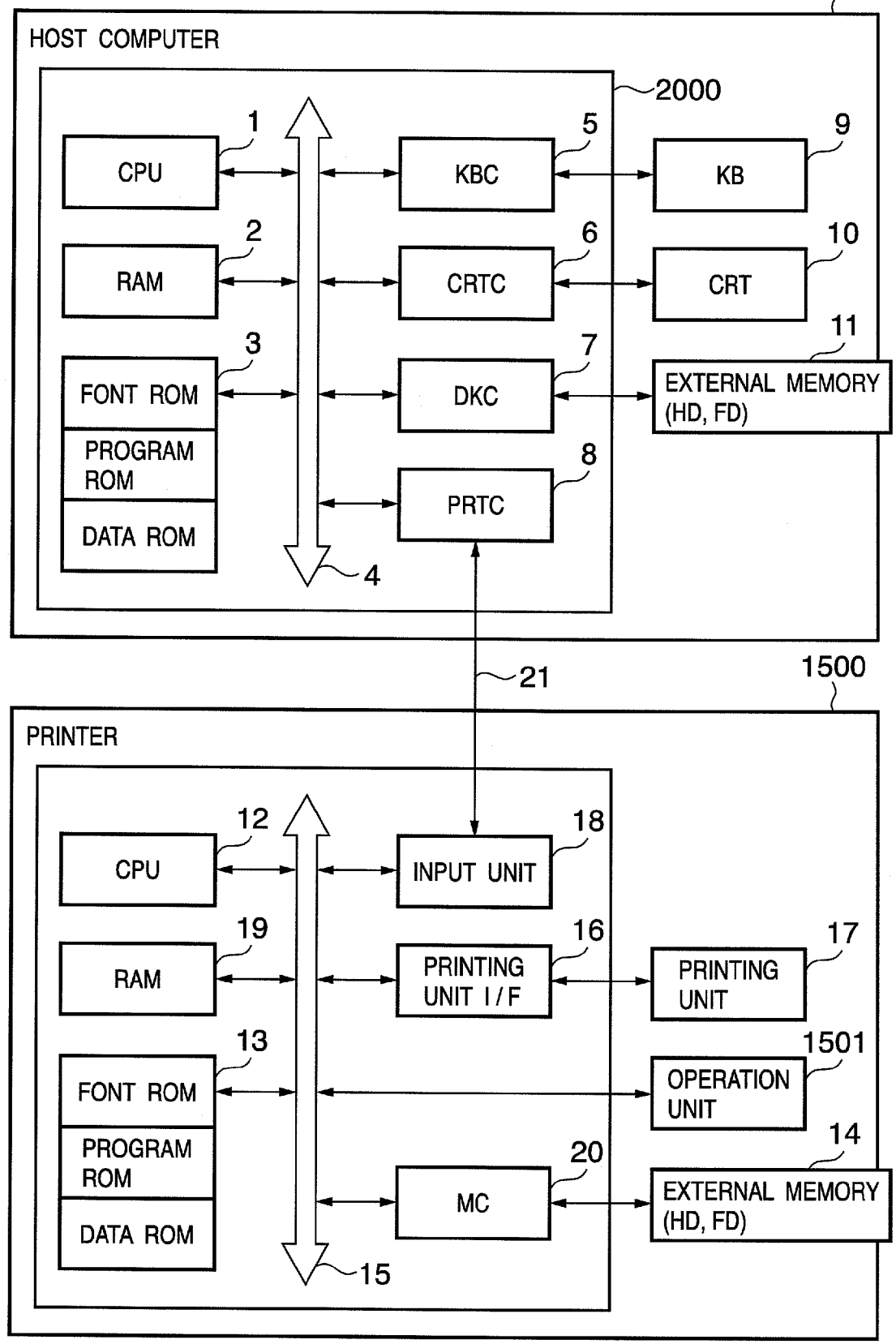
FIG. 2 is a block diagram showing the arrangements of a host computer 3000 and printer 1500 according to an embodiment of the present invention.

FIG. 2 is a block diagram showing the arrangements of the host computer 3000 and printer 1500. The present invention is applicable to a system formed from one or a plurality of devices, or a system connected via a network such as a LAN (Local Area Network) or WAN (Wide Area Network).

In FIG. 2, the computer 3000 comprises a CPU 1 which executes a program stored in the program ROM of a ROM 3 or an external memory 11. The program to be executed includes a document processing program for processing a document containing a figure, image, text, table (including a spreadsheet and the like), and the like, and printing on the basis of the document process. The program also includes programs for implementing the procedures of flowcharts shown in FIGS. 4, 5, 7, 9, 10, 13, 14, and 15, and the like.

The CPU 1 executes an operating system (to be referred to as an OS hereinafter) stored in the RON 3 or external memory 11 to comprehensively control each device connected to a system bus 4. The font ROM of the ROM 3 or the external memory 11 stores font data and the like used in the document process. The data ROM of the RON 3 or the external memory 11 stores various data (e.g., document data) used to perform the document process and the like. A RAM 2 is the main memory of the CPU 1 which functions to save programs and data or as a work area and the like.

A keyboard controller (KBC) 5 controls a key input from a keyboard 9 or a pointing device (not shown). A CRT controller (CRTC) 6 controls display on a display 10 such as a CRT. A disk controller (DKC) 7 controls access to the external memory 11 such as a hard disk (HD) or flexible disk (FD). The external memory 11 stores a boot program, various applications, font data, user files, edit files, a printer control command generation program (to be referred to as a printer driver hereinafter), and the like. A printer controller (PRTC) 8 connects to the printer 1500 via a bidirectional interface (interface) 21, and executes a communication control process with the printer 1500.

The CPU 1 opens various windows registered in advance and executes various data processes on the basis of commands input with the mouse cursor (not shown) or the like on the CRT 10. In printing, the user opens a window associated with print settings, and can set the printer and a printing method to the printer driver including selection of the print mode.

A CPU 12 controls the printer 1500. The printer CPU 12 executes, e.g., a control program stored in a ROM 13 or a control program stored in an external memory 14, thereby outputting an image signal serving as printout information to a printing unit (printer engine) 17 connected to a system bus 15.

The program ROM of the ROM 13 stores a control program for the CPU 12, and the like. The font ROM of the ROM 13 stores, e.g., font data used to generate the printout information. The data ROM of the ROM 13 stores, e.g., information used in a computer when the printer does not have any external memory 14 such as a hard disk.

The CPU 12 can communicate with the computer via an input unit 18. This arrangement allows the CPU 12 to notify the computer 3000 of internal information of the printer and the like. A RAM 19 functions as a main memory, work area, and the like for the CPU 12. The RAM 19 can increase its memory capacity by an optional RAM connected to an expansion port (not shown). The RAM 19 is used as an output information expansion area, environment data storage area, NVRAM, and the like.

A memory controller (MC) 20 controls access to the external memory 14 such as a hard disk (HD) or IC card. The external memory 14 is connected as an option, and stores font data, an emulation program, form data, and the like. The input unit 18 includes a switch, LED display, and the like for operation on the operation panel. The printer 1500 may have an NVRAM (not shown) and store printer mode setting information from an operation panel 1501.

The printing unit 17 is an electrophotographic engine in the first embodiment. The printing unit 17 finally prints data on a print medium such as paper by toner dots. The printing method of the present invention is not limited to electrophotographic printing. For example, the present invention is also applicable to a printing apparatus of another type (e.g., inkjet type) which prints by forming dots.

<Software Configuration of Printing System>

Figure 3:
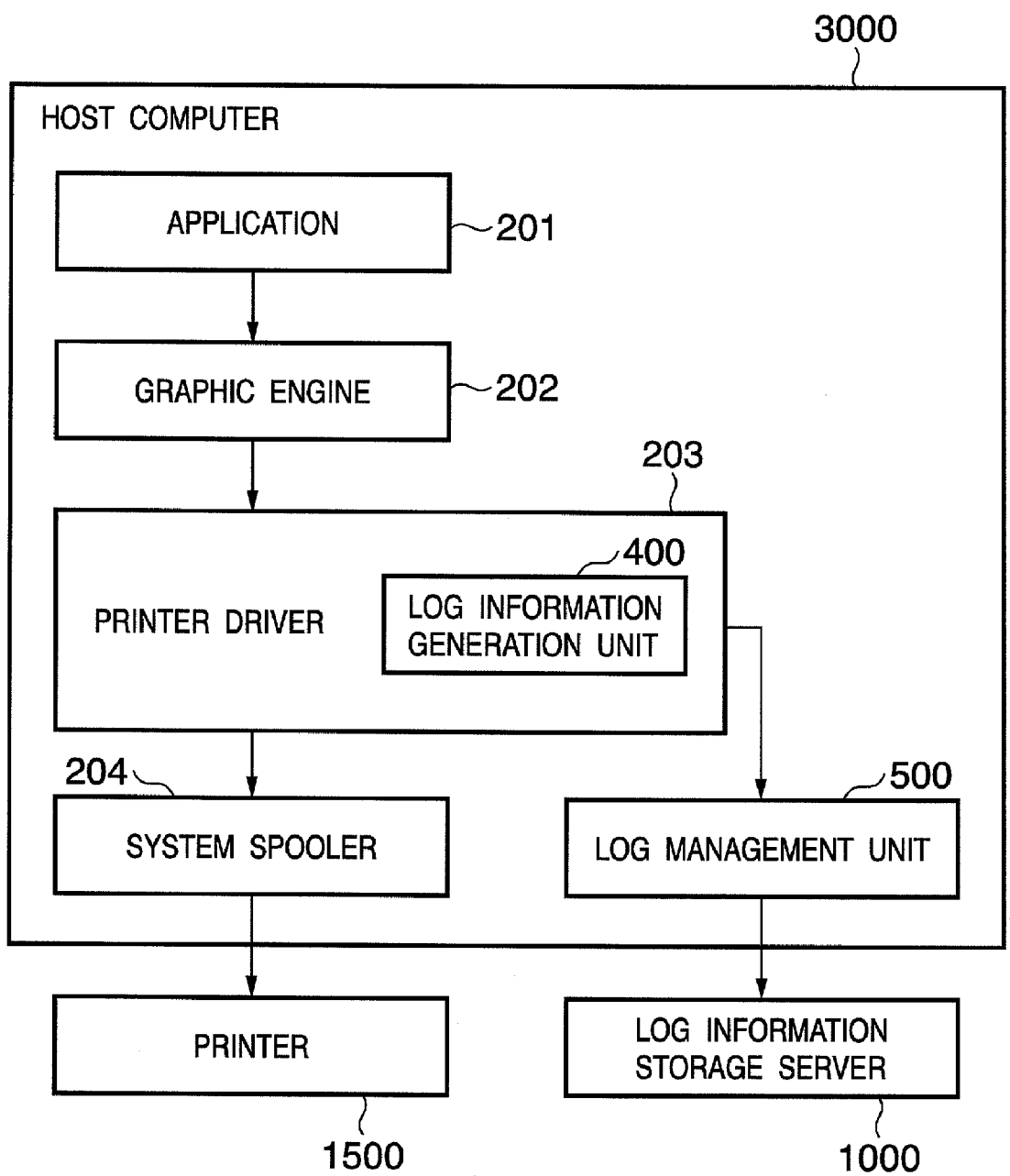
FIG. 3 is a block diagram showing an arrangement for a printing process in the computer 3000.

FIG. 3 is a block diagram showing a configuration for a printing process in the computer 3000 shown in FIG. 1. The host computer 3000 includes an application 201, graphic engine 202, printer driver 203, and system spooler 204 as files saved in the external memory 11. The application 201, graphic engine 202, printer driver 203, and system spooler 204 are program modules which are loaded to the RAM 2 and executed by the OS or a module that use them.

Figure 6:
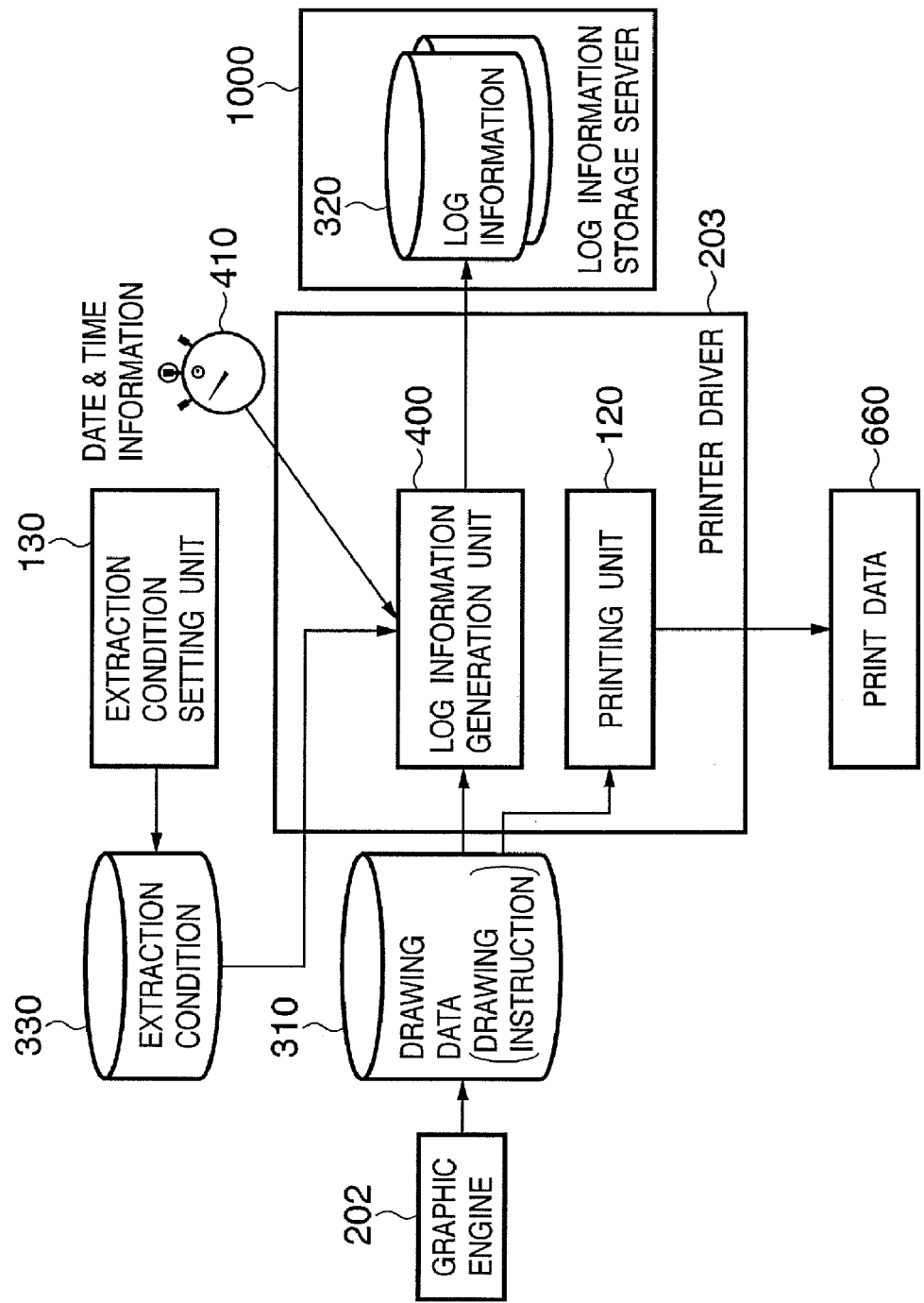
FIG. 6 is a block diagram showing a security level change process corresponding to the printing date and time.

FIG. 3 shows an arrangement common to the embodiments of the present invention including the first embodiment. As shown in FIG. 6 and the like, the printing system of each embodiment comprises building elements in addition to the blocks shown in FIG. 3. These building elements will be explained with reference to detailed drawings.

The application 201 and printer driver 203 are addable to the FD of the external memory 11, a CD-ROM (not shown), or the HD of the external memory 11 via a network (not shown). The application 201 saved in the external memory 11 is loaded into the RAM 2 and executed. When the application 201 instructs the printer 1500 to print, the graphic engine 202 which is also loaded into the RAM 2 and becomes ready is used to output (draw) an image.

The graphic engine 202 loads, from the external memory 11 to the RAM 2, the printer driver 203 prepared for each printing apparatus such as a printer. The graphic engine 202 sets an output from the application 201 in the printer driver 203. The graphic engine 202 converts a GDI (Graphic Device Interface) function received from the application 201 into a DDI (Device Driver Interface) function, and outputs the DDI function to the printer driver 203. The printer driver 203 converts data into a control command, e.g., PDL (Page Description Language) recognizable by the printer on the basis of the DDI function received from the graphic engine 202. The converted printer control command passes through the system spooler 204 loaded into the RAM 2 by the OS, and then the command is output as print data to the printer 1500 via the interface 21. Although the GDI is a program installed in a Windows® OS, another OS comprises a similar mechanism and the printer driver 203 generates print data.

The printing system according to the first embodiment comprises a log information generation unit 400 in the printer driver 203. The log information generation unit 400 may be a built-in module of the printer driver 203 or a library module added by individual installation. By executing the log information generation unit 400, the printer driver 203 extracts and generates log information, and sends the generated log information to a log management unit 500.

The log management unit 500 receives (or intercepts) the log information, and transfers it to the log information storage server 1000. The log management unit 500 may process or select the received log information, as needed. Alternatively, simultaneously when receiving log information, the log management unit 500 may transmit it to the log information storage server 1000, or temporarily store it in a storage area such as a hard disk and transmit it to the log information storage server 1000 in accordance with a separately designated transmission schedule.

<Log Information Collection Process>

Figure 4:
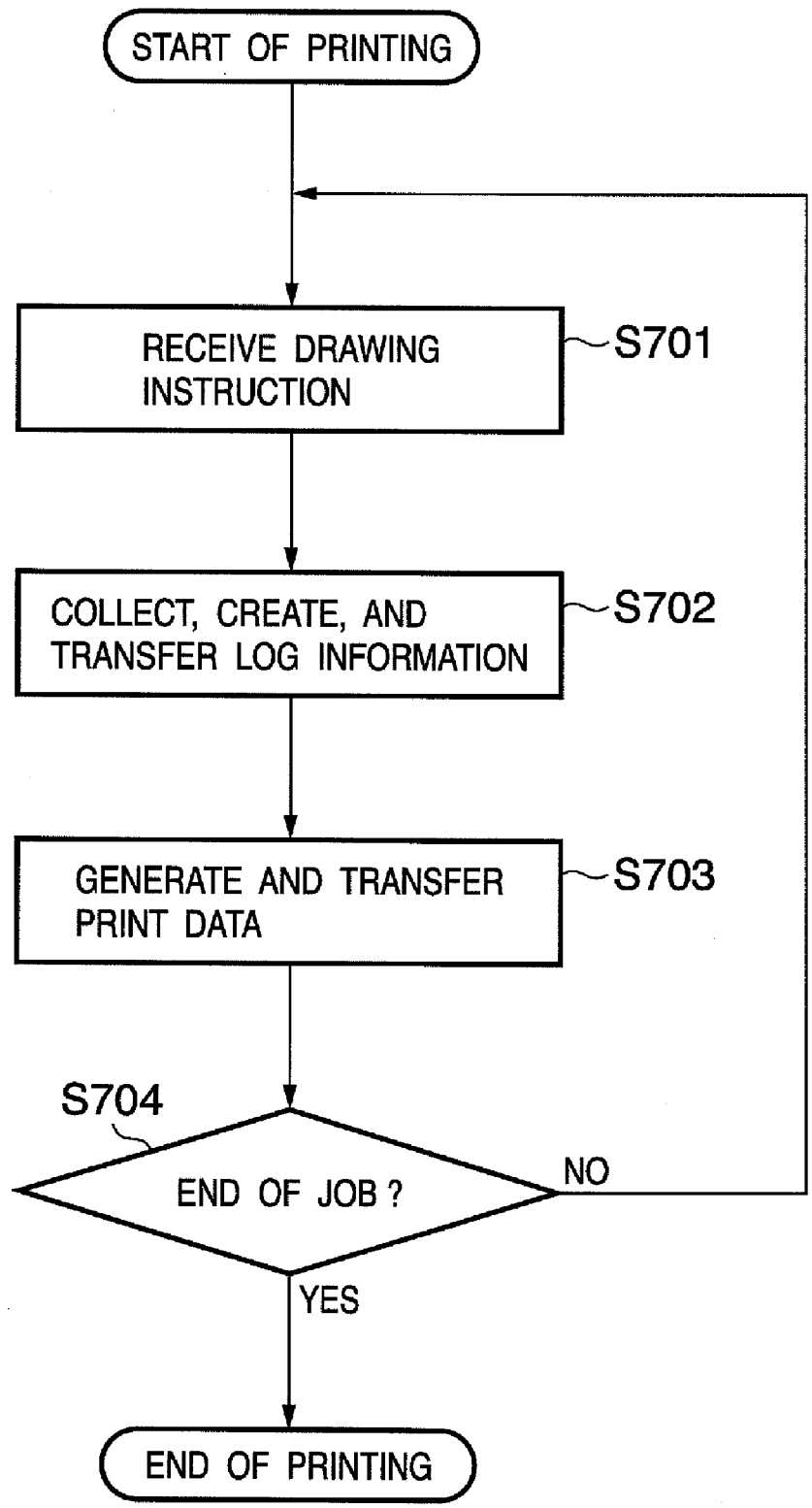
FIG. 4 is a flowchart showing the procedures of the process of a log information generation unit.

FIG. 4 is a flowchart showing the procedures of the processes of the printer driver 203 and log information generation unit 400. A job tracking process by the log information generation unit 400 will be explained with reference to FIG. 4.

After a print job starts, the printer driver 203 receives a drawing instruction (DDI command) from the GDI in step S701. In step S702, the log information generation unit 400 of the printer driver 203 collects and generates log information complying with the received drawing instruction, and transmits it to the log management unit 500.

After collecting, generating, and transferring the log information, the printer driver 203 generates, in step S703, print data (control command recognizable by the printer 1500) complying with the drawing instruction received in step S701. The printer driver 203 writes the print data in the system spooler 204. The despooler reads out the print data saved in the spooler, and transfers it to the printer 1500.

The printer driver 203 receives the drawing instruction by, e.g., each instruction unit, and generates print data. In step S704, the printer driver 203 determines whether it has received a job end instruction representing the end of receiving all drawing instructions which form one print job.

The printer driver 203 repetitively executes drawing command reception (S701), log information generation/transfer (S702), and print data generation/transfer (S703) until the job end instruction is processed (step S704).

Collection, generation, and transfer of log information in step S702 will be explained. Log information specifies a path and time until print data is generated and output, or a print requesting user or the like. Log information contains, e.g., the following job attributes and the like:

(1) the user ID of a user who requested a printing process,
(2) the client name and address of the print requesting source,
(3) the application program name of the print requesting source,
(4) the date and time when a print request was issued,
(5) the address or ID of a printer which prints,
(6) specific information contained in print data, and
(7) the ID of a print job.

These pieces of information are merely an example, and the log information may contain another information or need not contain all the pieces of information. Log information is collected from information transferred from an application in principle, but the application need not transfer information acquirable by the printer driver 203. For example, the printer driver can acquire the print request generation time from the real time timer.

Specific information contained in print data corresponds to a text, image, figure, or the like output as a printed material. For example, the log information generation unit 400 extracts character codes from print data except for image data whose amount is large, and collects them as log information. The log information generation unit 400 may also collect image data and graphic data as log information. The log information generation unit 400 may also collect a designated character string as log information. A user or administrator may designate a character string in advance to save it, or a character string designated by the management client 4000 or the like may be saved. In this case, the log information generation unit 400 searches print data for a character string which matches the saved character string, and when they match each other, collects, as log information, the detected character string or a character string of a predetermined length including the detected character string.

The log information generation unit 400 generates log information by associating the collected data with a code representing the meaning (i.e., item) of the data. The log information generation unit 400 gives the log information an identifier. The log information need not always take this format as far as the meaning of collected data can be determined later. The log information generation unit 400 finally transfers the generated log information to the log management unit 500.

The log management unit 500 transmits the received log information to the log information storage server 1000. The log information storage server 1000 registers the log information in the database. The saved log information can be read out by using each contained item as a search key and designating the value or range of each item.

<Log Information Search Process>

An outline of a search process in the log information storage server 1000 will be explained. The storage in the log information storage server 1000 accumulates log information of each print job. The log information storage server 1000 is divided into a search execution unit which executes search in accordance with a search execution instruction from the management client 4000, and a search result processing unit which processes a search result output from the search execution unit.

Figure 5:
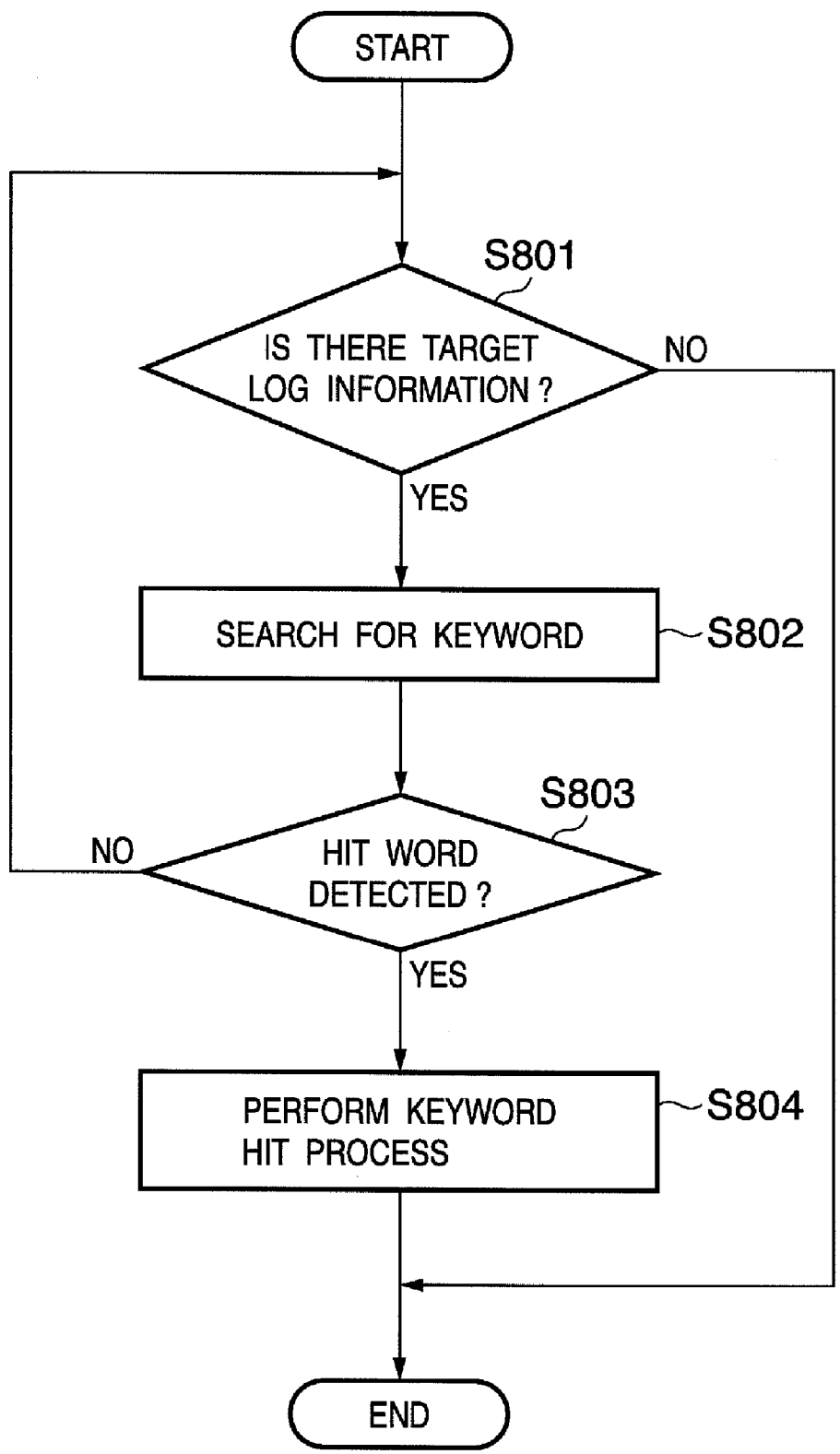
FIG. 5 is a flowchart showing the procedures of a search process in a log information management server.

FIG. 5 is a flowchart showing the procedures of a search process in the log information management server. The search process of the log information storage server 1000 starts upon reception of a search execution instruction from the management client 4000. The administrator may issue a search execution instruction from the management client 4000 at an arbitrary timing, or the management client 4000 may be scheduled to periodically issue a search execution instruction.

Upon reception of the search execution instruction, the log information storage server 1000 checks whether there is log information to be searched (step S801). If the log information storage server 1000 determines in this process that there is no log information to be searched, it ends the search process and sends back a message to this effect to the client 4000. If there is log information to be searched, the log information storage server 1000 executes a keyword search process using a keyword designated by a user through the client 4000 (step S802).

After the end of keyword search, the log information storage server 1000 determines whether search results include a search hit (step S803). If there is no search hit, the process returns to step S801 again. If another log information to be searched remains, the log information storage server 1000 searches the log information for the keyword.

If there is a search hit, the log information storage server 1000 executes a search hit process (step S804). In the search hit process, the log information storage server 1000 reads out data recorded in the hit log information (also called a log file), and saves the data as an independent file (called a detected file) or mails the file to an administrator. The detected file records information representing job attributes (e.g., the printing date and time, user name, and print job name), identifier information of the hit log information, hit keyword information, and the like. After executing step S804, the process returns to step S801 to process all pieces of target log information.

The printing system according to the first embodiment will be explained in more detail. The printing system according to the first embodiment has the configuration as shown in FIGS. 1 to 6. The printing system according to the first embodiment further comprises a software configuration shown in FIG. 6 in detail. With this arrangement, the first embodiment performs a process to change the contents and search keyword of log information in accordance with the printing date and time.

<Detailed Description of Software Blocks>

FIG. 6 is a block diagram showing the simplest system of a security level change process corresponding to the printing date and time. The graphic engine 202 in the host computer 3000 transfers drawing data 310 to the printer driver 203. The printer driver 203 incorporates the log information generation unit 400. However, this form does not limit the scope of the present invention, and the log information generation unit 400 may be a module independent of the printer driver 203. The log information generation unit 400 may be applied to any image forming step in a copying machine or the like. The log information generation unit 400 is a function processing unit which implements step S702 in FIG. 4. The log information generation unit 400 receives the drawing data 310, generates log information 320 in accordance with date & time information 410 and an extraction condition contained in an extraction condition file 330, and transfers the log information 320 to the log management unit 500 (not shown in FIG. 6). The log information storage server 1000 saves the log information 320. The date & time information 410 is readable from the real time clock of the computer. The extraction condition file 330 saves information representing an extraction condition for extracting log information from print data. The extraction condition file 330 is stored in the external memory 11 or the like.

A printing unit 120 is a function processing unit which executes the process in step S703 of FIG. 4. The printing unit 120 converts the drawing data 310 into a data format (to be referred to as print data 660) processible by the printer 1500, and transfers the print data 660 to the spooler 204. The spooler 204 transmits print data to the printer 1500 which prints. The spooler 204 and printer 1500 are not shown in FIG. 6.

In the first embodiment and the remaining embodiments described below, "time information" is not limited to only the date and time, but means information on the time including the time range which designates a date and time, the month, the date, the day of the week, the time period, or a combination of them. For example, month designation and time period designation can also be combined, or day-of-the-week designation and time period designation can also be combined.

An extraction condition setting unit 130 sets various extraction conditions corresponding to time information. The extraction conditions include various items such as information on the attributes of a print job, information (called a character string recording flag) representing whether to extract a text from print contents, and information (called an image recording flag) representing whether to generate a page image. The print job attributes include, e.g., the printing date and time, the job name, information for specifying a user who executes printing, information for specifying a printing client PC, and information for specifying a device which prints. When generating a page image, the number of colors of an image to be generated, the resolution, and the like can also be designated as extraction conditions. The extraction condition is information for defining the items and quality of data (information) contained in the log information 320.

Further, the first embodiment allows designating items and the quality registered as an extraction condition for each time information (e.g., the day of the week or the time period).

In the first embodiment, the extraction condition setting unit 130 displays a user interface for inputting an extraction condition by a user, and saves the input extraction condition in a predetermined format in the external memory 11 or the like. The predetermined format allows the log information generation unit 400 to read a saved extraction condition and generate log information in accordance with the contents of the extraction condition. For example, the extraction condition is saved together with the correspondence between an ID representing each item and time information representing the day of the week, the time period, or the like. The user interface displays a menu appropriate for each item, and allows a user to designate whether to set the item as an extraction condition, select time information corresponding to the item, or directly input a character string or the like as an extraction condition. Items irrespective of the date and time are registered without any correspondence with time information. As for an item for which different values are designated for respective time periods, the item can be registered in correspondence with pieces of time information.

More specifically, the extraction condition is one data file, and one record corresponds to one item to be extracted. The ID and time information of an item to be extracted are contained as a field which forms the record. When there is a condition added to the item ID, like extraction of a character string, this condition also forms one field. Each field has a code representing the meaning of the field. This is merely an example, and the extraction condition can take any format as far as the format allows specifying an item to be extracted together with a designated condition.

The log information generation unit 400 refers to the extraction condition file 330 in generating the log information 320 from the received drawing data 310. The log information generation unit 400 generates the log information 320 with contents corresponding to the acquired date & time information 410. In FIG. 6, the extraction condition setting unit 130 sets the extraction condition file 330, but the log information generation unit 400 may statically hold the extraction condition.

Figure 7:
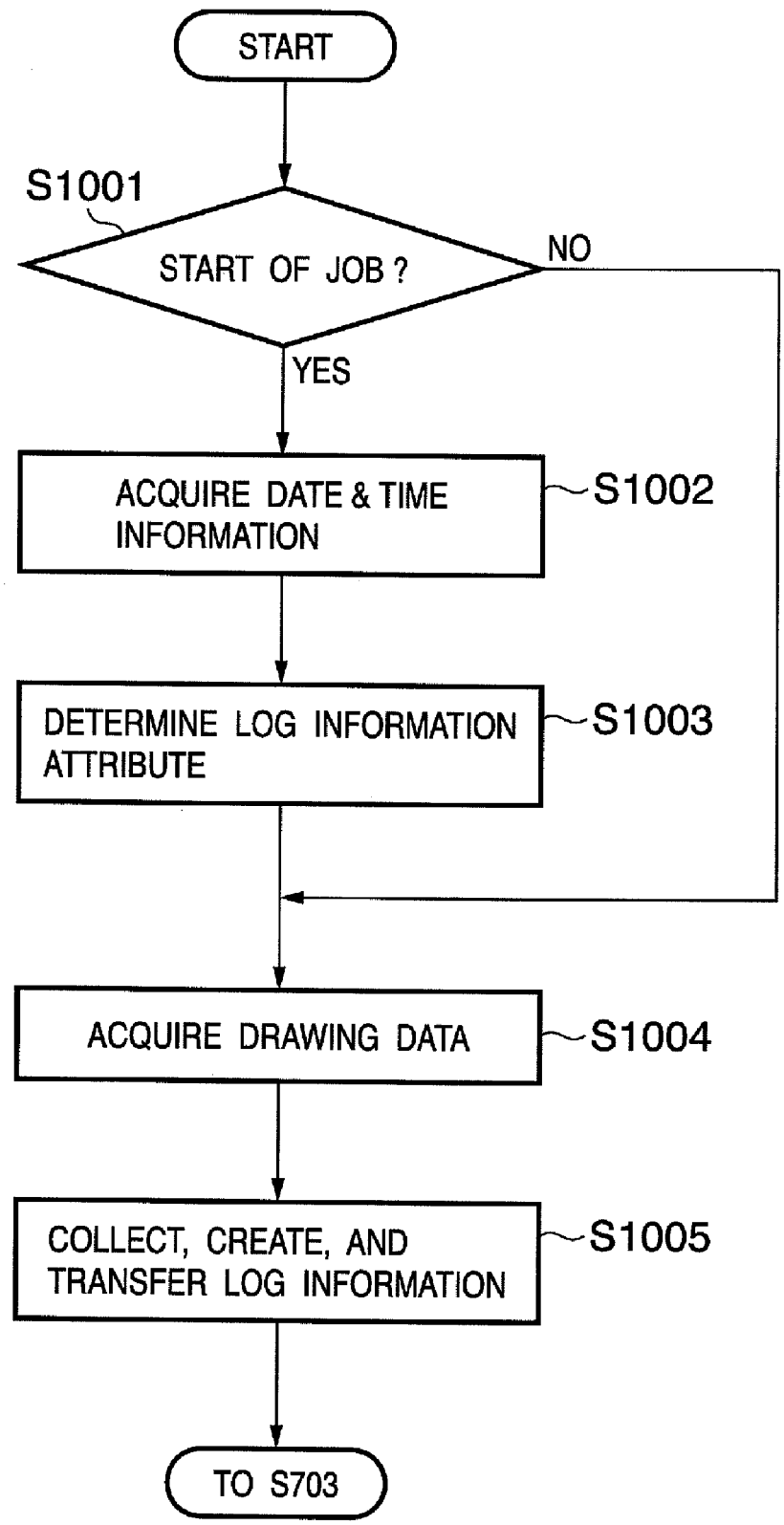
FIG. 7 is a flowchart showing the process of the log information generation unit in FIG. 6.

FIG. 7 is a flowchart showing the process of the log information generation unit 400. The log information generation unit 400 executes procedures in FIG. 4, similar to the first embodiment, except the contents of step S702. The flowchart in FIG. 7 explains in detail the process in step S702 of FIG. 4 in the first embodiment.

In step S1001, the log information generation unit 400 determines whether to start a job. For example, if the received drawing instruction is a job start instruction, the log information generation unit 400 can determine to start a job. At the start of the job, the attributes and contents of log information to be collected for the print job are not determined. Thus, the log information generation unit 400 reads the real time clock or the like to acquire date & time information such as the current date and time or the day of the week (step S1002). In step S1003, the log information generation unit 400 refers to the extraction condition file 330 to determine print job attributes and contents to be collected as log information. That is, when the extraction condition contains an item whose value corresponds to time information, the log information generation unit 400 compares the current date and time with the time information to determine whether the item matches the current date and time. The log information generation unit 400 determines the matching item as an item (collection target item) to be collected, and saves the ID list (collection target list) of the collection target item in the external memory 11 or the like. The log information generation unit 400 determines an item having no correspondence with time information, as an collection target item which is to be unconditionally collected, and saves the item in the collection target list.

For example, the extraction condition contains an item "user ID" which does not correspond to time information. Further, the extraction condition registers an item "character string recording flag" in correspondence with weekends (Saturday and Sunday). The extraction condition also registers a character string (extraction character string) to be extracted.

In this case, if the current date and time represent a weekday, only the item (user ID) which does not correspond to time information is collected. Hence, the collection target item list saves the item ID of the item "user ID". If the current date and time represent a weekend, the collection target item list saves, as collection target items, the character string recording flag corresponding to the time information representing weekends, and the character string to be extracted, in addition to the item (user ID) not corresponding to time information.

In step S1004, the log information generation unit 400 acquires the drawing data 310. In step S1005, the log information generation unit 400 collects log information from the drawing data 310 in accordance with the attributes and contents of items in the collection target list saved in step S1004. The log information generation unit 400 generates log information and transfers it to the log management unit 500. The log information storage server saves the log information as the log information file 320. The search unit searches the log information file for a desired condition such as a keyword. Hit log information is read into the management client and inspected by a system administrator or the like. If information may leak, the system administrator investigates it.

As described above, the printing system can designate log information to be collected in accordance with time information such as the time or date. Log information to be actually collected changes depending on the date, the day of the week, or the time period. As a result, the printing system can change the amount of information to be collected between the time during which any prevention force acts in addition to the information leakage prevention effect of collecting log information by the printing system according to the present invention, and the remaining time. The number of collection target items can be decreased during a time period during which it is rationally considered that information hardly leaks, and increased during a time period during which it is considered that information readily leaks. This adjustment can increase the log information collection efficiency and inspection efficiency.

Second Embodiment

Figure 10:
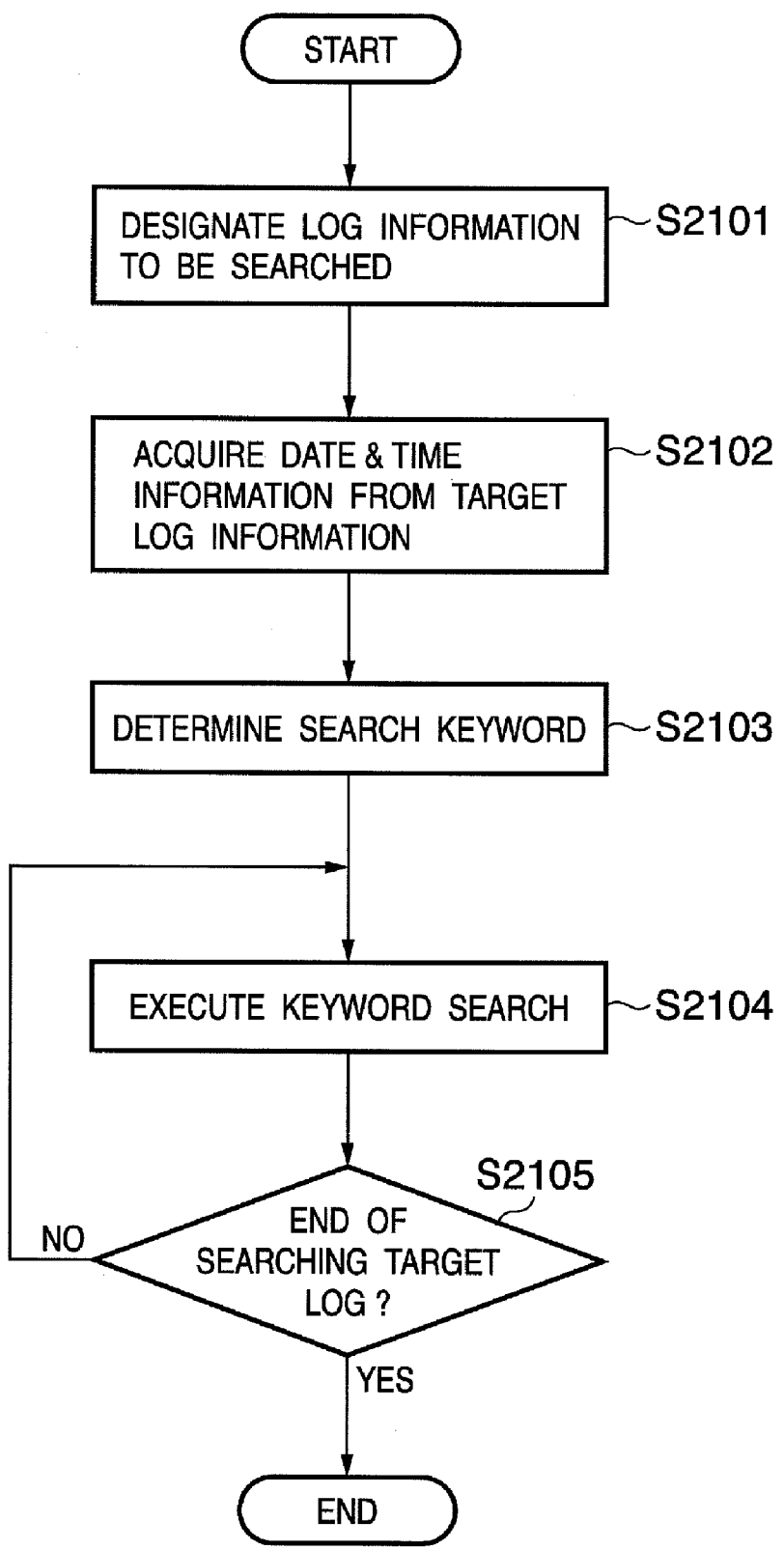
FIG. 10 is a flowchart showing the process of a search unit in FIG. 8.

The first embodiment has described a form in which the log information generation unit 400 changes the contents of the log information 320 in accordance with the issuing date and time of a print job. The second embodiment will describe a form in which a log information storage server 1000 for executing a search process executes a search process corresponding to the date and time. The second embodiment adopts FIG. 8 instead of FIG. 6 in the first embodiment, and FIG. 9 instead of FIG. 7. Details of step S802 in FIG. 5 are procedures as shown in FIG. 10. The remaining points are the same as those in the first embodiment.

In inspecting log information 320, text information contained in the log information 320 is mainly searched for. It is also possible to extract a text by OCR-processing an image contained in the log information 320, and set the extracted text data as a search target. Information secondarily generated from the log information 320 also undergoes logging.

Figure 8:
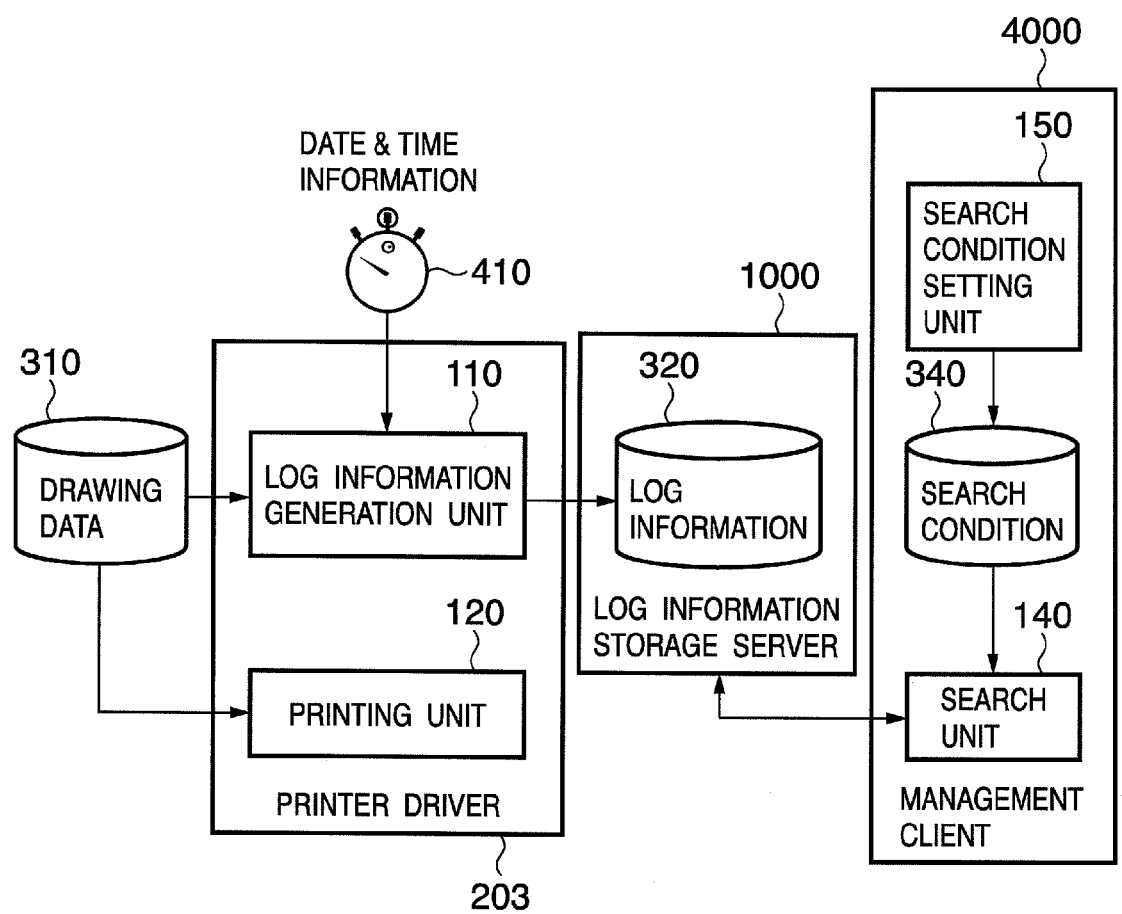
FIG. 8 is a block diagram showing a process to change search contents in accordance with the printing date and time.

FIG. 8 is a block diagram showing the simplest system of a process to change search contents in accordance with the issuing date and time of a print job. In FIG. 8, a search condition setting unit 150 is added. The search condition setting unit 150 sets a search keyword corresponding to the printing date and time (date and time when a print job is issued), and outputs it as a search condition file 340 to a search unit 140 which searches the log information 320. The above-mentioned time information representing a time period or the like can designate the printing date and time. For example, the user can set time information and a search keyword corresponding to the time information via a user interface provided by the search condition setting unit 150. In other words, the search condition file 340 is a file in which time information and a keyword corresponding to the time information form one record. Similar to FIG. 6, a log management unit 500 and system spooler are not shown in FIG. 8.

The search condition setting unit 150 can set a set of various search keywords in accordance with the date and time, and holds the setting result as the search condition file 340 in the system. A log information generation unit 110 embeds acquired date & time information 410 in the collected log information 320. The search unit 140 can recognize the time when a material corresponding to target log information 320 was printed.

FIGS. 9 and 10 are flowcharts showing the processes of the log information generation unit 110 and search unit 140 in FIG. 8. The process of the log information generation unit in FIG. 9 will be first described.

The processes in steps S1101 and S1102 are the same as those in steps S1001 and S1002 of FIG. 7 described above. In step S1103, the log information generation unit 110 creates the log information 320, and writes the acquired date & time information 410 in the log information 320. The written date & time information exists in an independent field so as to read out date & time information which satisfies a designated condition after registering the log information in the database. The processes in steps S1104 and S1105 are also the same as those in steps S1004 and S1005 of FIG. 7. In step S1105, the log information generation unit 110 collects information other than the registered date & time information, completing the log information 320. In creating the log information 320 in step S1105, the log information generation unit 110 may add the read date & time information to the log information.

In step S1105, the log information generation unit 110 directly uses a designated extraction condition (not shown in FIG. 8). The log information generation unit 110 does not execute a process (step S1003 in FIG. 7) to determine extraction information again in accordance with the print job issuing time. Also in the second embodiment, similar to the first embodiment, the attributes and contents of the log information may be changed in accordance with the printing time.

The process of the search unit in FIG. 10 will be explained. The flowchart in FIG. 10 describes the details of the process in step S802 of FIG. 5. The search unit 140 designates target log information 320 (step S2101). For example, the user is prompted to designate the log information 320 via a user interface. There are various designation methods. For example, the log information 320 can be designated by an attribute such as the ID, user ID, or printer name of a print job, or time information such as the time period during which the print job was issued. Depending on the designation method, the search unit 140 searches pieces of log information acquired from a plurality of print jobs. When searching all pieces of log information, the process skips step S2101.

If a condition is designated in step S2101, the search unit 140 acquires date & time information which satisfies the condition (i.e., date & time information registered in step S1103 of FIG. 9) from the database of the log information storage server 1000 (S2102). If no condition is designated, the search unit 140 acquires date & time information of all print jobs registered in the database.

The search unit 140 searches the search condition file 340 for a search keyword corresponding to the acquired date & time information, and determines the search keyword (S2103). The search unit 140 determines that a keyword registered in the search condition file 340 irrespective of time information is a hit search keyword. After that, the search unit 140 searches target information for the keyword determined in step S2103 (step S2104). The search unit 140 executes the search process for all pieces of target information (step S2105), and ends the search process for target log information 320. The search condition file 340 can also register a search condition other than a keyword.

By the above arrangement and process procedures, the printing system according to the second embodiment can designate a search condition such as a keyword in accordance with the issuing date and time of a print job. The printing system can change the log information inspection precision between a time period during which information is highly likely to leak, and a time period during which information is less likely to leak. Hence, the printing system can quickly, efficiently inspect log information.

A combination of the printing systems in the first and second embodiments can further increase both the information amount and efficiency of log information.

In place of steps S2101 and S2102, it is also possible to input time information such as the time period of search by a user and execute the processes in step S2103 and subsequent steps on the basis of the input time information.

Third Embodiment

The third embodiment will describe a process to set a time-limit extraction inspection level (e.g., log information contents or search keyword) for a specific document by a creator.

Figure 11:
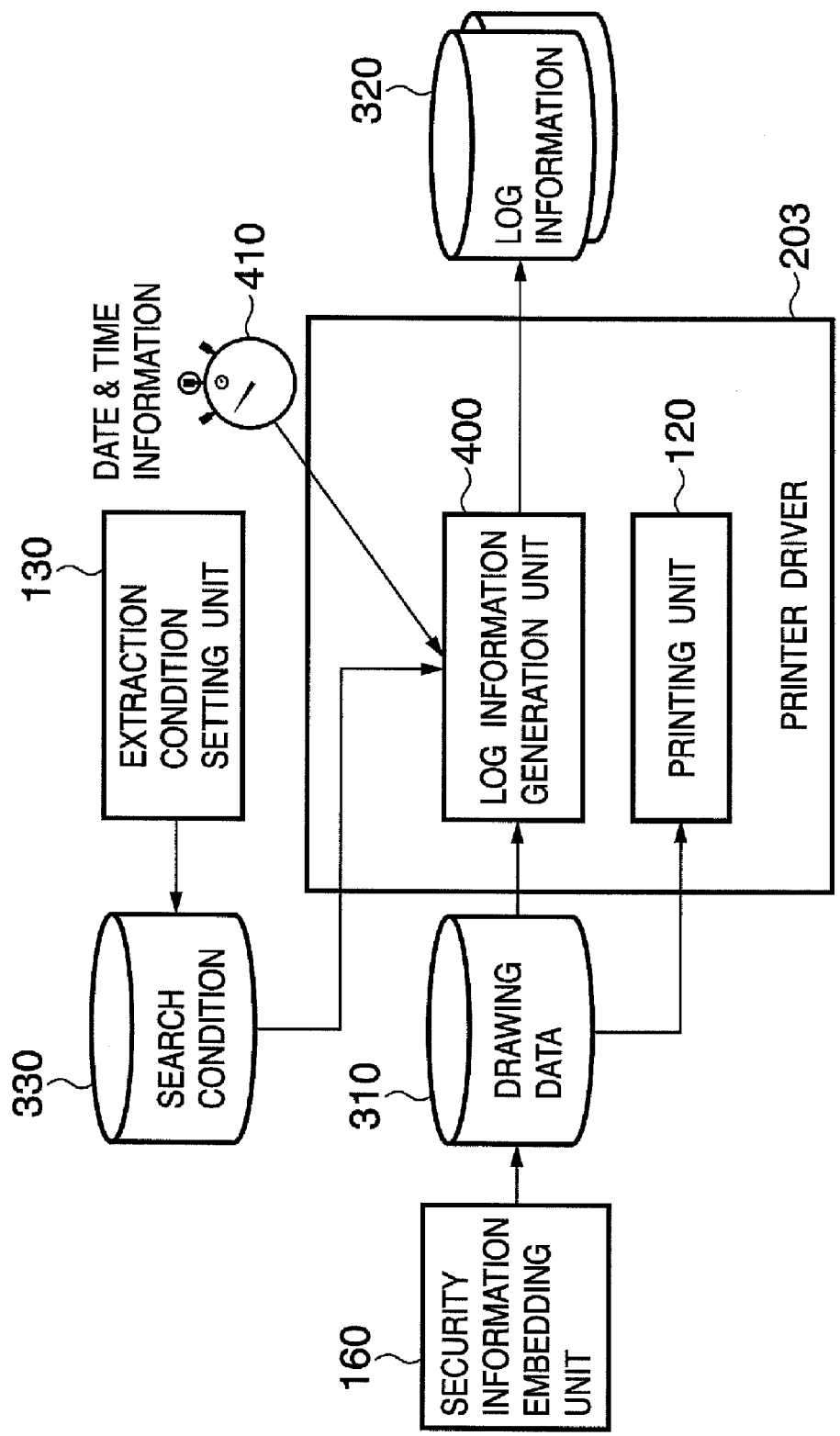
FIG. 11 is a block diagram showing a form of changing the contents of log information in accordance with time-limit security information set by a creator.
Figure 12:
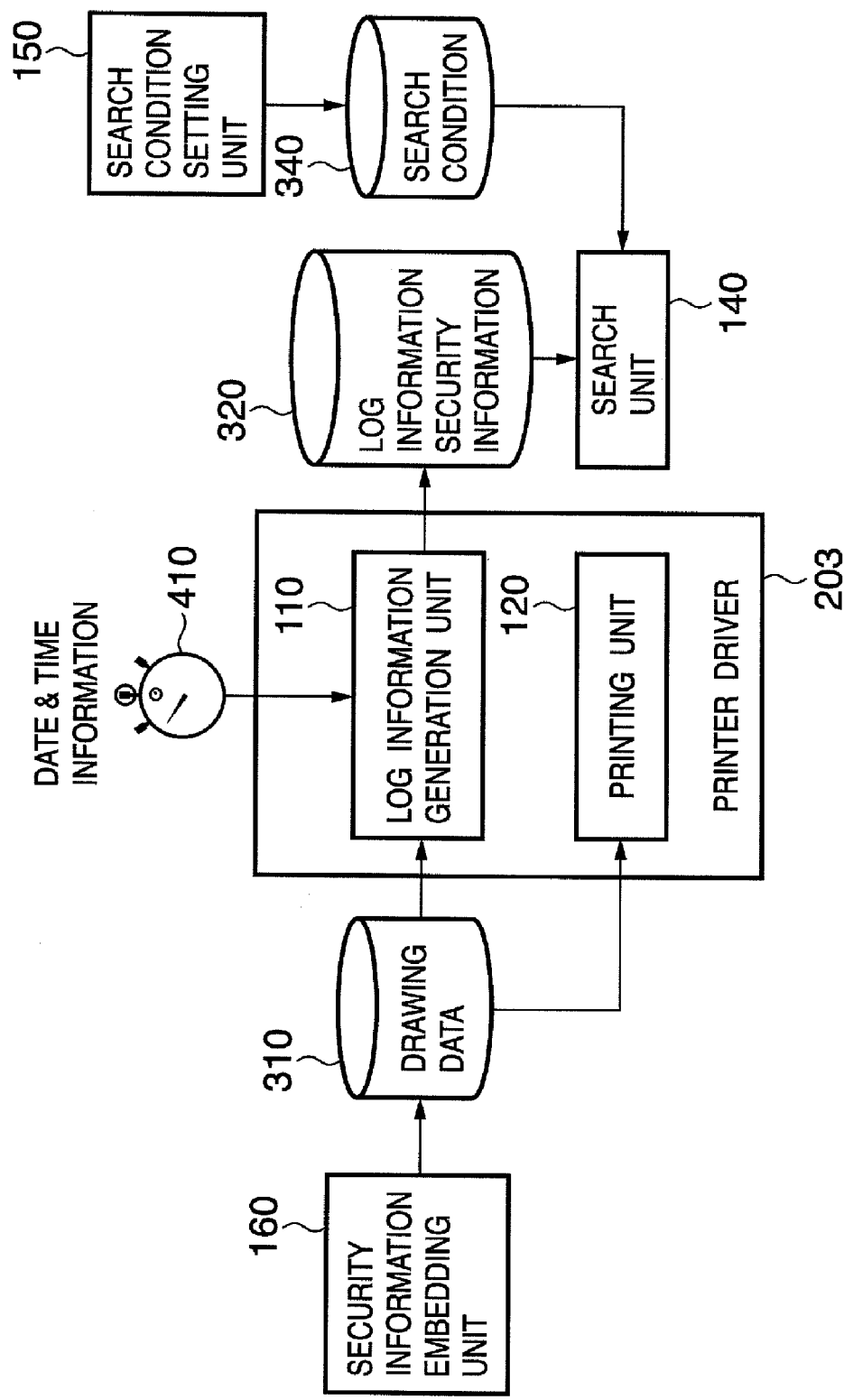
FIG. 12 is a block diagram showing a form of executing a search process in accordance with the time-limit security information set by the creator.

FIG. 11 is a block diagram when changing the contents of log information 320 in accordance with time-limit security information set by a creator. FIG. 12 is a block diagram showing a form of executing a search process corresponding to the time-limit security information set by the creator. A security information embedding unit 160 is added to FIGS. 6 and 8. Security information contains information representing the period during which security is enhanced, and information representing a security level in the period. The user inputs a period and security level to be contained in security information via a user interface provided by the security information embedding unit 160. The security information embedding unit 160 is, e.g., part of an application program, or part of a program such as a printer driver called in printing. The third embodiment presents the security information embedding unit 160 as an independent program.

The security information embedding unit 160 adds designated security information to image data (e.g., bitmap image data) contained in drawing data. Instead of information (security level) representing the level (security level) of security in a designated period, the security information may also contain an extraction condition for collecting log information, i.e., a print job attribute item or keyword.

The printing system manages drawing data containing security information so as to inhibit a user except for the creator from deleting or tampering the drawing data. For this purpose, the printing system controls access to the drawing data containing security information so as to inhibit a user except for an authenticated user from accessing the drawing data. Security information embedded in image data is output visibly or invisibly on the paper surface of a printed material.

In the third embodiment, the printing system comprises a computer and printer. The security information embedding unit 160 adds security information as, for example, one of the parameters of a drawing instruction to draw image data. When the printing system is a copying machine or the like and does not use any drawing command, the security information embedding unit 160 may embed security information in image data using the digital watermark technique. In this case, the security information embedding unit 160 adds security information to image data before executing copying in a copying operation. For this purpose, the security information embedding unit 160 can exploit the digital watermark technique. To create a digital watermark, lossless coding is desirable so as to decode security information.

In this way, the security information embedding unit 160 embeds designated security information in drawing data or image data to be printed by the printing system. More specifically, the designated security information contains period information on a period during which the security level is held high, and security level during the designated period or an extraction condition (e.g., the attribute or content of a print job or a search keyword). The period during which the security level is held high can also be indefinite. When the designated period is indefinite, log information is always generated in accordance with a set extraction condition in executing a print job subjected to log information collection, or executing copying (copy job). Log information is always searched for a set keyword.

<Change of Log Information in High-Security Period>

A process (FIG. 11) to change the contents of log information in accordance with high-security period information set by a creator will be explained. FIG. 11 shows an arrangement obtained by adding the security information embedding unit 160 to the arrangement of the first embodiment in FIG. 6. An extraction condition file 330 saves an extraction condition corresponding to a security level, in place of an extraction condition corresponding to time information. By giving a security level, this arrangement can determine an extraction condition. The extraction condition file 330 also saves a default extraction condition corresponding to no security level.

In FIG. 11, the security information embedding unit 160 intercepts an image data drawing instruction from drawing data transferred from an application program to the printer driver via the graphic engine. Alternatively, the security information embedding unit 160 selects and reads an image data drawing instruction from a drawing instruction received and temporarily saved in the printer driver. The security information embedding unit 160 embeds security information containing a designated period, security level, and the like in image data serving as the operand of the drawing instruction.

A log information generation unit 400 reads image data 310 containing the designated security information. The log information generation unit 400 determines the attributes and contents of log information 320 to be generated, in accordance with acquired date & time information and the period information contained in the security information added to the image data. For example, when the current date and time fall within a period represented by the period information contained in the security information, the log information generation unit 400 reads a security level corresponding to the period information. The log information generation unit 400 reads a condition such as an item corresponding to the read security level from the extraction condition file 330. The log information generation unit 400 determines that the read extraction condition is a collection target item, and saves the extraction condition in a collection target list in an external memory 11 or the like. The extraction condition such as an item in the collection target list represents information to be collected as log information.

When security information is added as a drawing instruction parameter, the log information generation unit 400 reads the parameter by identifying it on the basis of a code added to identify the parameter. When security information is embedded in image data, the log information generation unit 400 reads the security information using a decoding method corresponding to an encoding method used in embedding.

If security information embedded in image data contains the contents and quality of an item serving as an extraction condition during the period, the item and quality of the extraction condition, i.e., log information 320 are determined without referring to the extraction condition file 330. In this case, the extraction condition contained in the security information is directly copied to the collection target list.

After acquiring date & time information 410, if the log information generation unit 400 determines that the current date and time do not fall within the high-security period represented by period information, it saves a separately set extraction condition (above-mentioned default extraction condition) in the collection target list.

The log information generation unit 400 collects an item which satisfies the extraction condition determined in the above way, generates log information, and transfers it to a log management unit 500. A printing unit 120 generates print data so as to print the contents of security information contained in the drawing data 310 visibly or invisibly on the paper surface.

Figure 13:
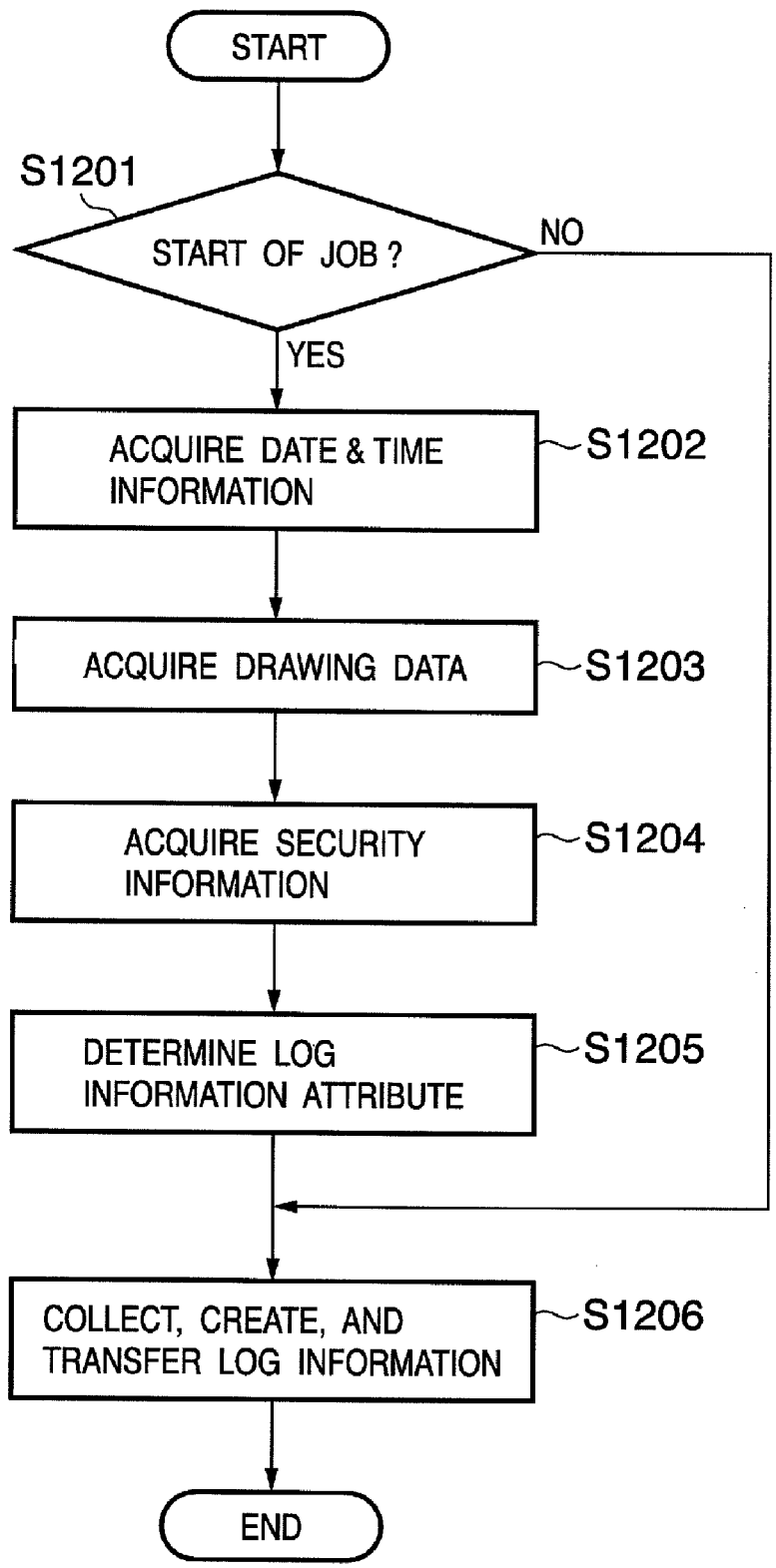
FIG. 13 is a flowchart showing the process of a log information generation unit in FIG. 11.

FIG. 13 is a flowchart showing the process of a log information generation unit 110 in FIG. 12. The process procedures will be simply explained. The log information generation unit 110 determines whether to start a job, on the basis of whether it has received a job start instruction (step S1201). At the start of the job, the log information generation unit 110 acquires the date & time information 410 (step S1202). Then, the log information generation unit 110 acquires drawing data (step S1203), and acquires security information contained in it (step S1204). As described above, the log information generation unit 110 determines an attributes and contents of log information 320 (or an extraction condition) to be generated on the basis of the date & time information, period information contained in the security information, and the corresponding security level (step S1205). The log information generation unit 110 collects and generates log information from the drawing data in accordance with the determined extraction condition, and transfers the log information to the log management unit 500 (step S1206).

As described above, the third embodiment embeds security information in drawing data to change the security level to a level designated for each designated period. The printing system extracts an item corresponding to the security level from print data, saves the item as log information, and can control the amount of information to be collected in accordance with the security level.

Fourth Embodiment

A process (FIG. 12) to change a search keyword in accordance with security information set by a creator will be explained with reference to the flowchart of FIG. 14. FIG. 12 is a block diagram showing a printing system according to the fourth embodiment. A search condition file 340 in FIG. 12 saves a search condition input from a search condition setting unit 150. A search unit searches log information corresponding to a search condition 320 which is read from the search condition file 340. A log information generation unit 110 reads date & time information and adds it to generated log information. A security information embedding unit 160 has the same function as that in the third embodiment.

Figure 14:
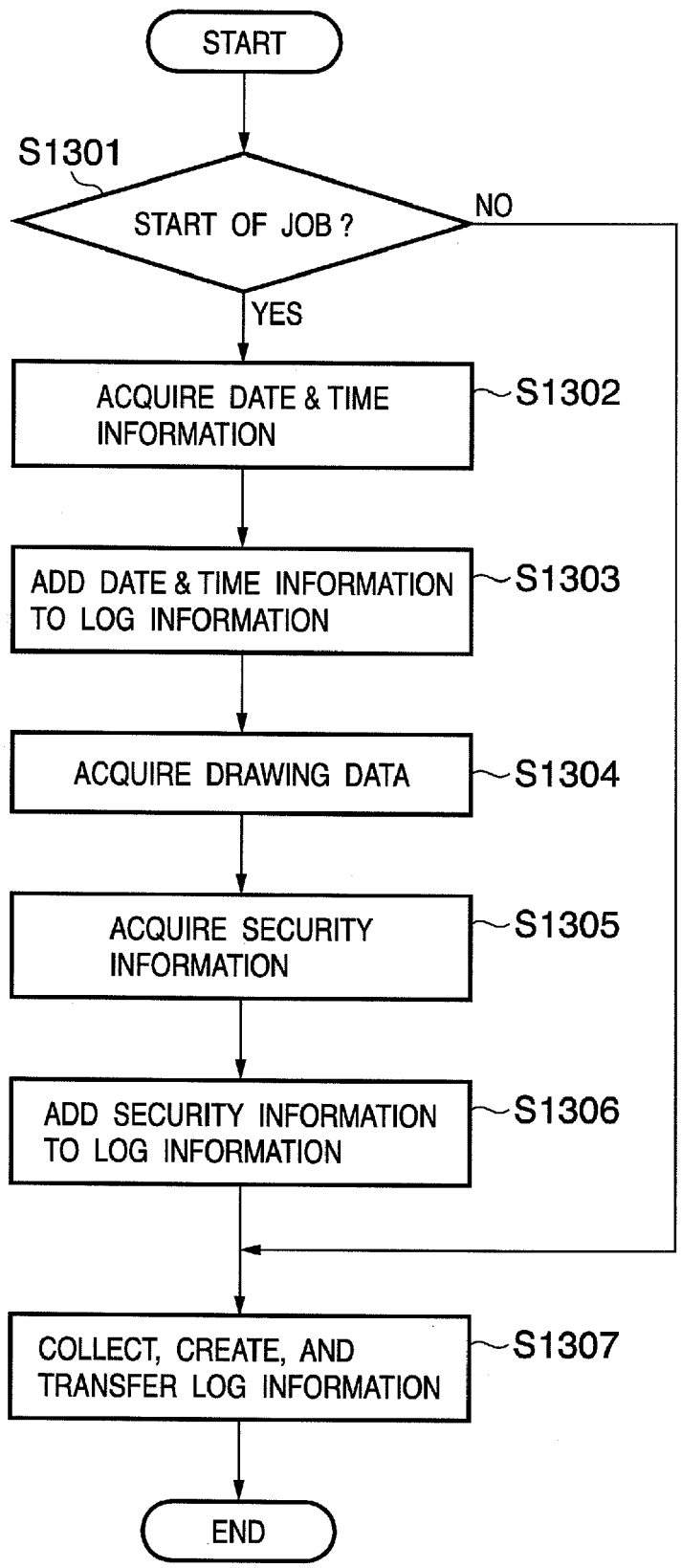
FIG. 14 is a flowchart showing the process of a log information generation unit in FIG. 12.
Figure 15:
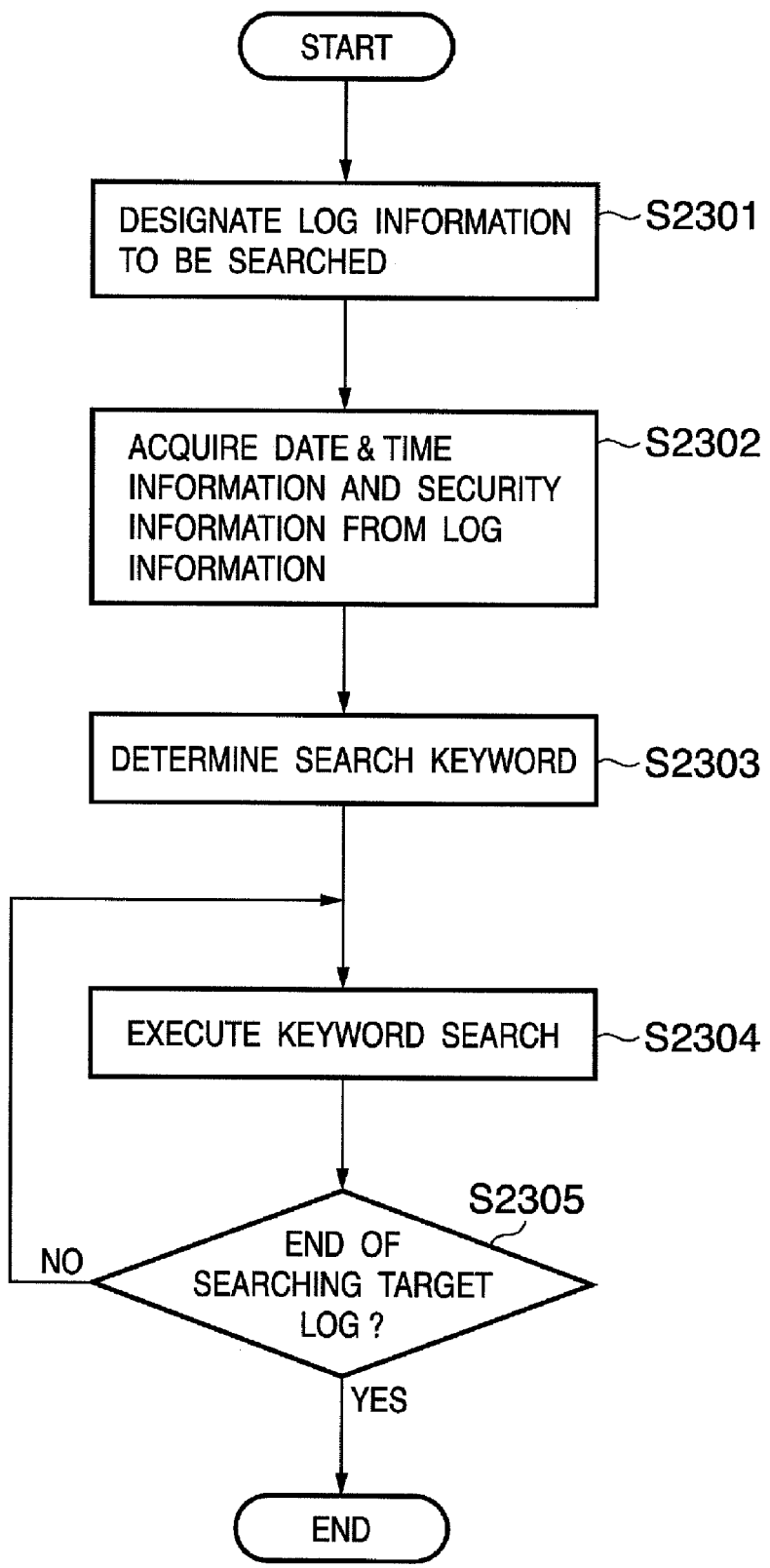
FIG. 15 is a flowchart showing the process of a search unit in FIG. 12.

The flowcharts in FIGS. 14 and 15 represent the processes of the log information generation unit 110 and a search unit 140, respectively. In FIG. 14, when the log information generation unit 110 starts up and detects the start of a job (step S1301), it acquires date & time information 410 (step S1302). The log information generation unit 110 writes the acquired date & time information after generating the log information 320 (step S1303) The date & time information to be written is added to the log information with a format capable of acquiring the date & time information from a database managed by a server 1000.

The log information generation unit 110 reads drawing data 310 (step S1304). A security information embedding unit 160 acquires security information embedded in the drawing data 310 (step S1305). The security information embedding unit 160 writes the acquired security information in the log information 320 (step S1306). This process can add security information to log information even when a security information-embedded drawing instruction or image data is not a collection target.

Steps S1304 and S1305 are executed by the same procedures as those in the third embodiment. Then, the log information generation unit 110 collects and creates each item of the log information, and transfers the log information to a log management unit 500 (step S1307). At this time, the log information file 320 contains the date & time information and security information in addition to normal collection items.

A process by the search unit of the log information storage server 1000 will be described. The search unit 140 designates target log information 320 (step S2301). For example, the user is prompted to designate the log information 320 via a user interface. There are various designation methods. For example, the log information 320 can be designated by an attribute such as the ID, user ID, or printer name of a print job, or time information such as the time period during which the print job was issued. Depending on the designation method, the search unit 140 searches pieces of log information acquired from a plurality of print jobs. When searching all pieces of log information, the process skips step S2301.

If a condition is designated in step S2301, the search unit 140 acquires, from the database of the log information storage server 1000, date & time information of the print job that satisfies the condition (i.e., date & time information registered in step S1303 of FIG. 14). The search unit 140 acquires, from the database of the log information storage server 1000, security information added to drawing data of the print job that satisfies the condition (S2302). If no condition is designated, the search unit 140 acquires date & time information and security information of all print jobs registered in the database.

The search unit 140 determines whether the time represented by the acquired date & time information falls within a period represented by the period information contained in the security information. That is, the search unit 140 determines whether the print job is a printing process during the high-security period. If the search unit 140 determines that the time falls within the period represented by the period information, i.e., the print job is printing during the high-security period, and if the security information acquired in step S2302 contains a concrete extraction condition, e.g., search keyword, the search unit 140 determines the keyword as a search keyword. The search unit 140 temporarily saves the determined search keyword in an external memory 11 or the like. If the security information contains an identifier representing a security level, the search unit 140 refers to the search condition file 340 to read a search keyword corresponding to the security level. The search unit 140 saves the keyword as a search keyword (S2303).

In step S2304, the search unit 140 executes a search process using the search keyword determined and saved in step S2303. A search condition setting unit 150 can set a search keyword corresponding to each security level, and the system holds the setting result as the search condition file 340. If the search unit 140 determines that printing is done during a period except for the high-security period represented by security information, it executes a search process using a search keyword of a normal operation level (i.e., a keyword corresponding to a default security level). Even in this case, the search unit 140 may acquire a search keyword from the search condition 340 (step S2304). In this manner, the search unit 140 searches all pieces of target log information 320 (step S2305).

As described above, the fourth embodiment embeds security information in drawing data to change the security level to a level designated for each designated period. The printing system extracts an item corresponding to the security level from print data, saves the item as log information, and can control the amount of information to be collected in accordance with the security level.

The printing system can search collected log information in accordance with the search condition of each designated period, and can increase the search efficiency.

Other Embodiment

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent No. 2005-342845, filed Nov. 28, 2005, which is hereby incorporated by reference herein in its entirety.

What is claimed is:

1. A printing system capable of collecting log information relevant to print data, comprising:
a registration unit configured to register, in order to extract log information, a first extraction condition for predetermined time information and a second extraction condition not associated with the predetermined time information, wherein in said first extraction condition, the predetermined time information is associated with each item to be extracted as log information when executing the print job during a time period defined by the predetermined time information;
a determination unit configured to compare the execution time of outputting the print data with a time range indicated by the predetermined time information in the first extraction condition and to determine that an item associated with the time range including the execution time is an item to be extracted as log information of the print data;
an extraction unit configured to extract, as log information, first information which is related to the items determined by said determination unit and second information which is related to the items according to the second extraction condition based on drawing instructions corresponding to the print data received by a printer driver; and
a save unit configured to save the log information extracted by said extraction unit in a storage unit,
wherein the extraction unit is configured to extract, as the log information, the second information which is related to the items according to the second extraction condition without extracting the first information which is related to the items determined by the determination unit when the execution time of outputting the print data is not within the time range indicated by the predetermined time information in the first extraction condition, and
wherein the printer driver acquires the execution time of outputting the print data used in the comparison made by said determination unit.

2. The system according to claim 1, wherein the extraction condition is input as information different from the print data.

3. The system according to claim 1, wherein the extraction condition is added to the print data and input together with the print data.

4. An information collection method of collecting log information relevant to print data, comprising the steps of:
registering, in order to extract log information, a first extraction condition for predetermined time information and a second extraction condition not associated with the predetermined time information, wherein in said first extraction condition, the predetermined time information is associated with each item to be extracted as log information when executing the print job during a time period defined by the predetermined time information;
comparing the execution time of outputting the print data with a time range indicated by the predetermined time information in the first extraction condition and to determine that an item associated with the time range including the execution time is an item to be extracted as log information of the print data;
extracting, as log information, first information which is related to the items determined in the determining step and second information which is related to the items according to the second extraction condition based on drawing instructions corresponding to the print data received by a printer driver; and
saving the log information extracted in the extracting step in a storage unit,
wherein in the extracting step, the second information which is related to the items according to the second extraction condition is extracted as the log information without extracting the first information which is related to the items determined by the determination unit when the execution time of outputting the print data is not within the time range indicated by the predetermined time information in the first extraction condition, and
wherein the printer driver acquires the execution time of outputting the print data used in the comparison in the comparing step.

5. A non-transitory computer-readable medium in which a program is embodied, said program causing a computer to execute a method of collecting log information relevant to print data, the method comprising the steps of:
registering, in order to extract log information, a first extraction condition for predetermined time information and a second extraction condition not associated with the predetermined time information, wherein in said first extraction condition, the predetermined time information is associated with each item to be extracted as log information when executing the print job during a time period defined by the predetermined time information;
comparing the execution time of outputting the print data with a time range indicated by the predetermined time information in the first extraction condition and to determine that an item associated with the time range including the execution time is an item to be extracted as log information of the print data;
extracting, as log information, first information which is related to the items determined in the determining step and second information which is related to the items according to the second extraction condition based on drawing instructions corresponding to the print data received by a printer driver; and
saving the log information extracted in the extracting step in a storage unit,
wherein in the extracting step, the second information which is related to the items according to the second extraction condition is extracted as the log information without extracting the first information which is related to the items determined by the determination unit when the execution time of outputting the print data is not within the time range indicated by the predetermined time information in the first extraction condition, and wherein the printer driver acquires the execution time of outputting the print data used in the comparison in the comparing step.

6. The system according to claim 1, wherein the extraction condition not associated with the time information is an item irrelevant to date/time among items relevant to the print data.

7. The system according to claim 1, wherein said registration unit is allowed to register an item relevant to the print data associated with a number of units of time information.

8. The system according to claim 1, wherein the item relevant to the print data which is registered as an extraction condition associated with the time information is either a keyword for retrieval or a print job attribute.

9. The system according to claim 1, wherein the keyword for retrieval is associated with at least one of date/time, day of the week and time zone, and wherein the print job attribute includes at least one of a print job ID, a user ID, a name of a requesting client of printing, a name of a requesting application program of printing and a printer name.

10. The system according to claim 1, further comprising a transfer unit configured to transfer print data to a printer via a system spooler, the print data being generated by the print driver according to the drawing instructions.

* * * * *